US012693632B2

(12) United States Patent
Fuji

(10) Patent No.: US 12,693,632 B2
(45) Date of Patent: Jul. 28, 2026

(54) WATCH COMPONENT, WATCH, AND METHOD FOR MANUFACTURING WATCH COMPONENT

(71) Applicant: SEIKO EPSON CORPORATION, Tokyo (JP)

(72) Inventor: Tsubasa Fuji, Shiojiri (JP)

(73) Assignee: SEIKO EPSON CORPORATION (JP)

(*) Notice: Subject to any disclaimer, the term of this patent is extended or adjusted under 35 U.S.C. 154(b) by 425 days.

(21) Appl. No.: 18/495,144

(22) Filed: Oct. 26, 2023

(65) Prior Publication Data

US 2024/0142914 A1 May 2, 2024

(30) Foreign Application Priority Data

Oct. 28, 2022 (JP) ................................ 2022-172947

(51) Int. Cl.
*G04B 45/00* (2006.01)
*G04B 19/06* (2006.01)

(52) U.S. Cl.
CPC ......... *G04B 45/0015* (2013.01); *G04B 19/06* (2013.01); *G04B 45/0076* (2013.01)

(58) Field of Classification Search
CPC ................ G04B 45/0015; G04B 19/06; G04B 45/0076; G04B 19/283; G04B 19/12; G04B 19/10
See application file for complete search history.

(56) References Cited

FOREIGN PATENT DOCUMENTS

JP 2011-106937 A 6/2011

OTHER PUBLICATIONS

CN 206791844 U (Spasov, V) machine translation (Year: 2017).*
JP 2010210343 A (Kawakami Atsushi) machine translation (Year: 2010).*

* cited by examiner

*Primary Examiner* — James A Dudek
(74) *Attorney, Agent, or Firm* — Harness, Dickey & Pierce, P.L.C.

(57) ABSTRACT

A watch component of the present disclosure includes a substrate, a multilayer film that covers at least a part of the substrate and includes a color adjusting film having a function of adjusting a color tone, a first transparent film stacked at the multilayer film, having a predetermined refractive index, and formed in a freely selected pattern, and a second transparent film stacked at the first transparent film or the multilayer film, and having a refractive index different from that of the first transparent film by a predetermined difference.

10 Claims, 5 Drawing Sheets

WATCH COMPONENT, WATCH, AND METHOD FOR MANUFACTURING WATCH COMPONENT

The present application is based on, and claims priority from JP Application Serial Number 2022-172947, filed Oct. 28, 2022, the disclosure of which is hereby incorporated by reference herein in its entirety.

BACKGROUND

1. Technical Field

The present disclosure relates to a watch component, a watch, and a method for manufacturing the watch component.

2. Related Art

JP-A-2011-106937 discloses a watch in which layers A made of a resin-containing material and layers B made of a resin-containing material different from that of the layers A and having a refractive index different from that of the layers A are stacked at a watch dial.

In JP-A-2011-106937, the layers A and the layers B having different refractive indices are alternately and repeatedly disposed so that a deep color tone can be expressed, while maintaining a sufficiently high light transmittance as the watch dial.

In JP-A-2011-106937, although a deep color tone can be expressed, there was a problem that it was not possible to express a freely selected pattern and to enhance design properties.

SUMMARY

A watch component of the present disclosure includes a region, the region including: a substrate, a multilayer film covering at least a part of the substrate and including a color adjusting film having a function of adjusting a color tone, a first transparent film stacked at the multilayer film, having a predetermined refractive index, and formed in a freely selected pattern, and a second transparent film stacked at the first transparent film or the multilayer film, and having a refractive index different from that of the first transparent film by a predetermined difference.

A watch component of the present disclosure includes a region, the region including: a substrate, a multilayer film covering at least a part of the substrate and including a color adjusting film having a function of adjusting a color tone, a first transparent film stacked at the multilayer film, having a predetermined refractive index, and formed in a freely selected pattern, and a second transparent film stacked at the multilayer film at which the first transparent film is partially formed, and having a refractive index different from that of the first transparent film by a predetermined difference.

A watch of the present disclosure is a watch configured using the watch component, wherein any one of a dial, an oscillating weight, an abbreviation, a hand, a bezel, or a belt is configured using the watch component.

A method for manufacturing a watch component of the present disclosure includes a multilayer film forming step of forming a multilayer film to cover at least a part of a substrate, the multilayer film including a color adjusting film having a function of adjusting a color tone, a first transparent film forming step of stacking, at the multilayer film, a first transparent film having a predetermined refractive index and formed in a freely selected pattern, the first transparent film forming step being performed after the multilayer film forming step, and a second transparent film stacking step of stacking, at the first transparent film or the multilayer film, a second transparent film having a refractive index different from that of the first transparent film by a predetermined difference, the second transparent film stacking step being performed after the first transparent film forming step.

A method for manufacturing a watch component of the present disclosure includes a multilayer film forming step of forming a multilayer film to cover at least a part of a substrate, the multilayer film including a color adjusting film having a function of adjusting a color tone, a first transparent film forming step of stacking, at the multilayer film, a first transparent film having a predetermined refractive index and formed in a freely selected pattern, the first transparent film forming step being performed after the multilayer film forming step, and a second transparent film stacking step of stacking, at the multilayer film at which the first transparent film is partially formed, a second transparent film having a refractive index different from that of the first transparent film by a predetermined difference, the second transparent film stacking step being performed after the first transparent film forming step.

DESCRIPTION OF EMBODIMENTS

A watch 1 according to an embodiment of the present disclosure will be described below with reference to the drawings.

Figure 1:
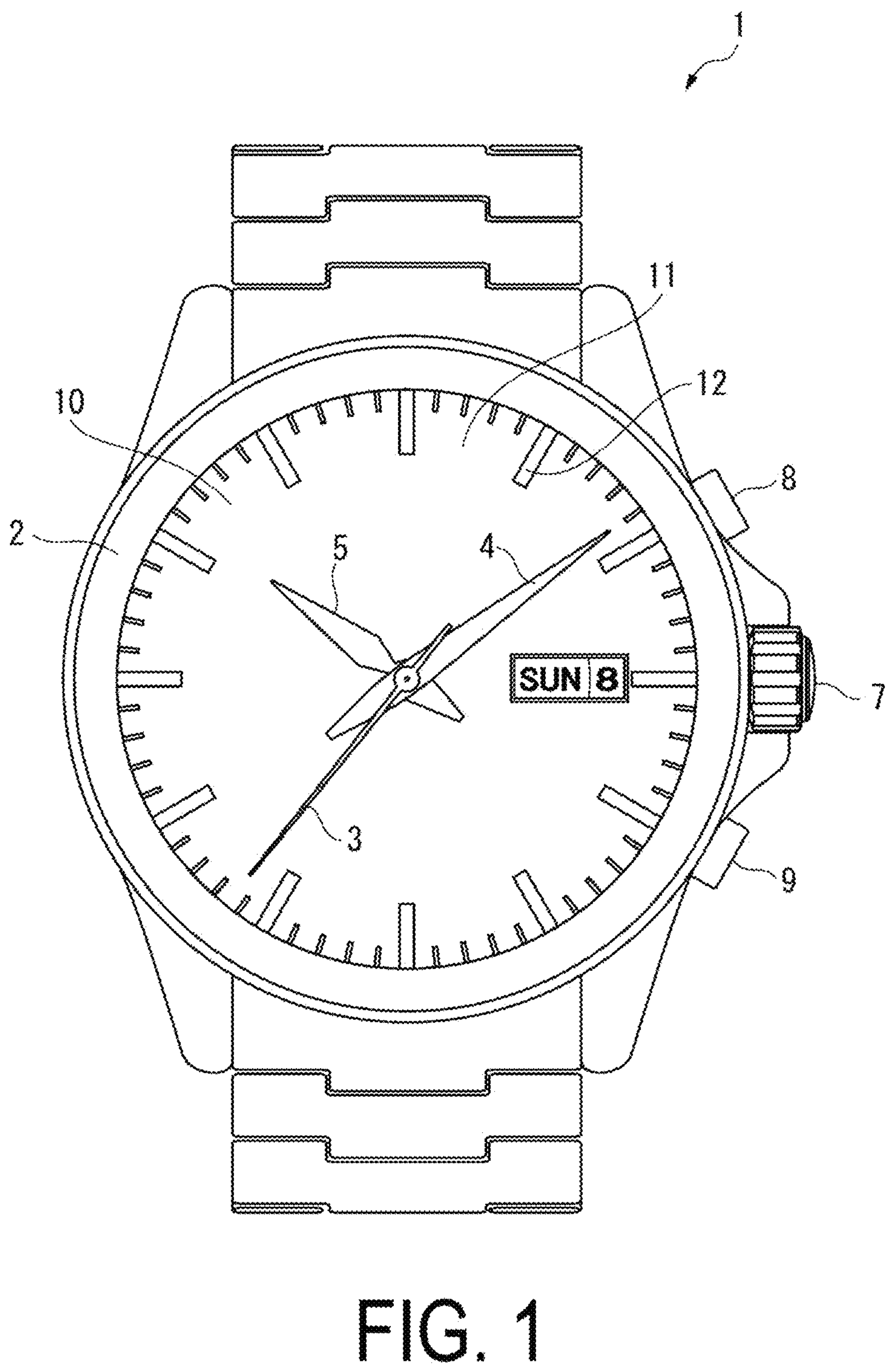
FIG. 1 is a front view illustrating a watch according to one embodiment of the present disclosure.

FIG. 1 is a front view illustrating the watch 1. In the embodiment, the watch 1 is configured as a wristwatch worn on a user's wrist.

As illustrated in FIG. 1, the watch 1 includes a metal case 2. The case 2 includes, in the inside, a disk-shaped dial 10, a seconds hand 3, a minute hand 4, an hour hand 5, a crown 7, a button A 8, and a button B 9. The dial 10 includes a dial body part 11, and an hour mark 12 provided at the dial body part 11. Note that the dial 10 is an example of a watch component of the present disclosure.

Dial Body Part

Figure 2:
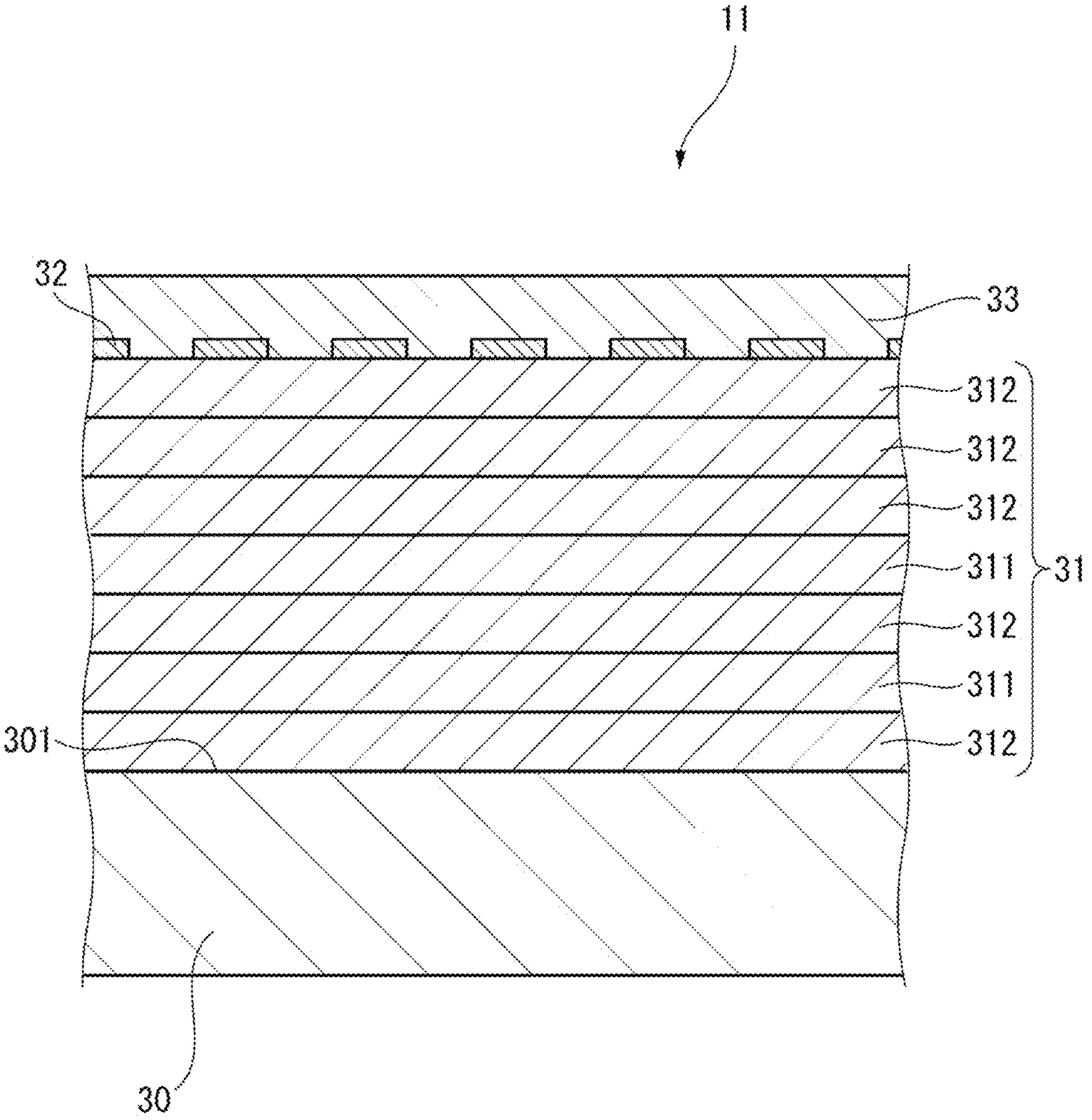
FIG. 2 is a cross-sectional view illustrating a main part of a dial body part of the above-described embodiment.

FIG. 2 is a cross-sectional view illustrating a main part of the dial body part 11. Note that FIG. 2 is a cross-sectional view obtained by cutting a substrate 30 in the dial body part 11 in a thickness direction.

As illustrated in FIG. 2, the dial body part 11 includes the substrate 30, a multilayer film 31, a first transparent film 32, and a second transparent film 33. In the embodiment, the substrate 30 is entirely covered with the multilayer film 31. That is, the multilayer film 31 is stacked covering the entirety of a surface 301 of the substrate 30.

Note that the dial body part 11 is not limited to the above-mentioned configuration, and the multilayer film 31 may be stacked covering a part of the surface 301 of the substrate 30, for example.

Substrate

A material of the substrate 30 is composed of metal such as iron, brass, and aluminum, resin, or the like. Note that when the substrate 30 is composed of resin, the resin may be a non-light transmissive resin that does not transmit light, or a light transmissive resin that transmits light.

In addition, in the embodiment, a freely selected pattern is formed at the surface 301 of the substrate 30. A method for forming the pattern is not particularly limited, and for example, the pattern can be formed by using processing such as cutting processing, laser processing, chemical removal processing, polishing processing, and forging/casting processing.

Multilayer Film

The multilayer film 31 includes a color absorbing film 311 and a color adjusting film 312 and is stacked at the surface 301 of the substrate 30.

The color absorbing film 311 is formed using metal. Note that Ag, Pt, Au, Cu, Al, Cr, Sn, Fe, Ti or the like, an alloy thereof, or the like may be used as the metal forming the color absorbing film 311. In the embodiment, two layers of the color absorbing films 311 are formed and stacked at the color adjusting film 312.

A method for forming the color absorbing film 311 is not particularly limited, and examples thereof include ion-assisted vapor deposition, ion plating vapor deposition, vacuum vapor deposition, and sputtering. In this manner, the layer configuration of the multilayer film 31 can be freely changed.

The color adjusting film 312 is a film that adjusts a color tone through optical interference. In the embodiment, five layers of the color adjusting films 312 are formed. That is, the color absorbing films 311 and the color adjusting films 312 constitute the seven-layered multilayer film 31.

In addition, in the embodiment, the color adjusting film 312 is configured as a film including an inorganic film. More specifically, the color adjusting film 312 may be composed of a material including at least one of $Ta_2O_5$, $SiO_2$, $TiO_2$, $Al_2O_3$, $ZrO_2$, $Nb_2O_5$, $HfO_2$, $Na_5Al_3F_{14}$, $Na_3AlF_6$, $AlF_3$, $MgF_2$, $CaF_2$, $BaF_2$, $YF_3$, $LaF_3$, $CeF_3$, or $NdF_3$. In this manner, since these inorganic substances have high chemical stability, high stability and durability of the external appearance as a watch component can be achieved.

Note that a method for forming the color adjusting film 312 is not limited, and examples thereof include ion-assisted deposition, ion plating vapor deposition, vacuum deposition, and sputtering. In this manner, the layer configuration of the multilayer film 31 can be freely changed.

First Transparent Film

The first transparent film 32 is a transparent film that is stacked at the multilayer film 31, has a predetermined refractive index, and transmits a part of incident light. In the embodiment, the first transparent film 32 is made of an epoxy paint and has the refractive index of 2.2.

Further, the first transparent film 32 is stacked at the multilayer film 31 with the first transparent film 32 having a freely selected pattern. That is, in plan view viewed from a thickness direction of the substrate 30, there are a portion where the first transparent film 32 is formed and a portion where the first transparent film 32 is not formed. In other words, there are a portion where the first transparent film 32 is stacked at the multilayer film 31 and a portion where the multilayer film 31 is exposed. In other words, the first transparent film 32 is partially formed at the multilayer film 31.

Second Transparent Film

The second transparent film 33 is a transparent film that is stacked at the first transparent film 32 or the multilayer film 31, has a predetermined refractive index, and transmits a part of incident light. That is, the second transparent film 33 is stacked at the first transparent film 32 at a portion where the first transparent film 32 is formed, and is stacked at the multilayer film 31 at a portion where the first transparent film 32 is not formed. In other words, the second transparent film 33 is stacked at the multilayer film 31 at which the first transparent film 32 is partially formed.

In addition, in the embodiment, the second transparent film 33 is made of an acrylic paint and has a refractive index of 1.6. That is, in the embodiment, the second transparent film 33 has a refractive index different from that of the first transparent film 32 by a predetermined difference. That is, the second transparent film 33 has the refractive index different from that of the first transparent film 32 by 0.6.

As described above, in the embodiment, the dial 10 has a region in which the multilayer film 31, the first transparent film 32, and the second transparent film 33 are stacked at the substrate 30.

Method for Manufacturing Dial

Figure 3:
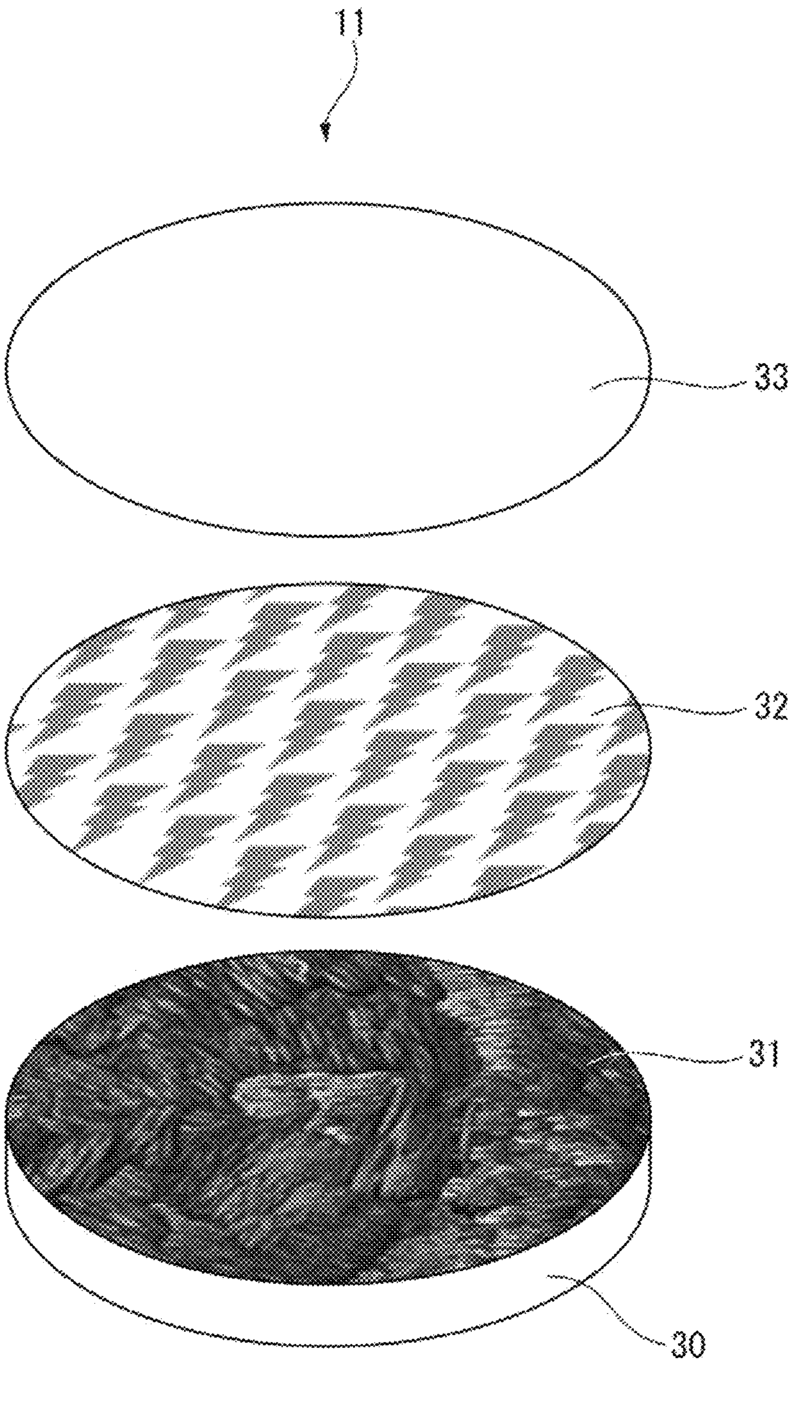
FIG. 3 is a diagram illustrating a manufacturing process for the dial body part of the above-described embodiment.
Figure 4:
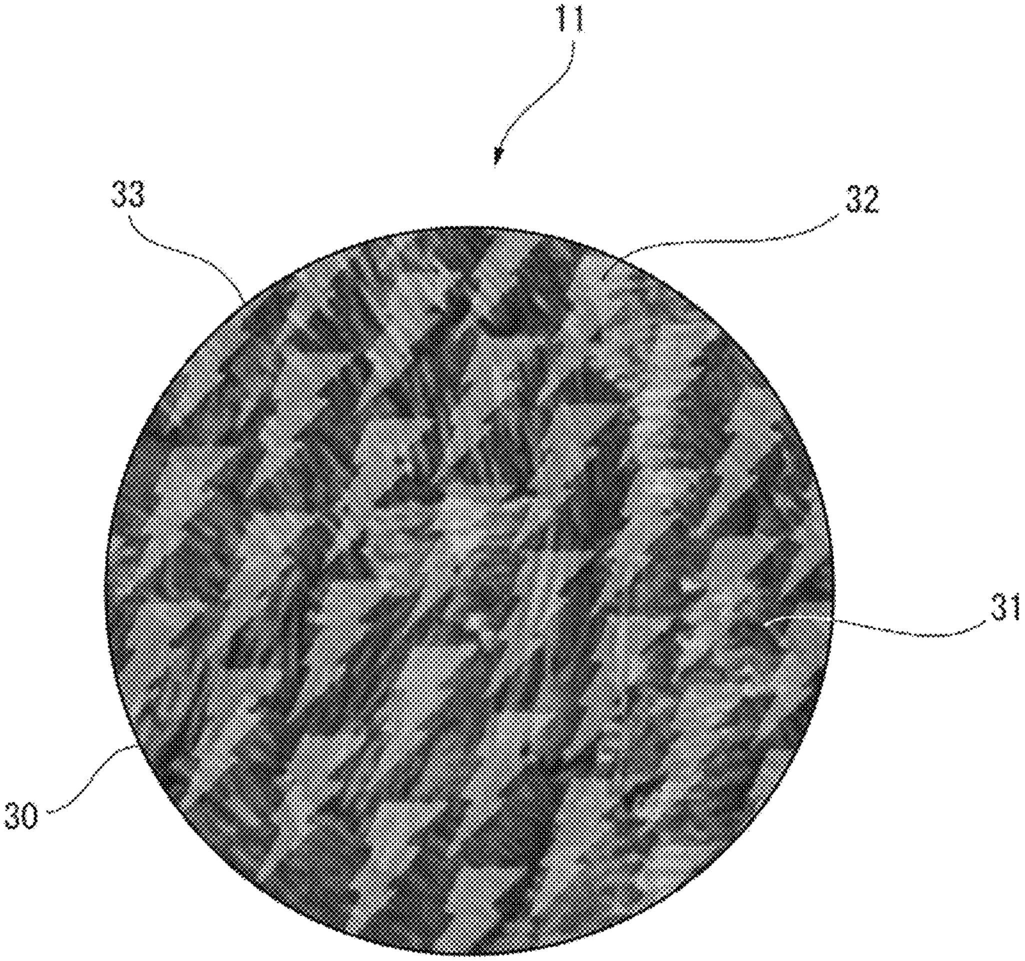
FIG. 4 is a front view illustrating an outline of the dial body part of the above-described embodiment.

FIG. 3 is a diagram illustrating a manufacturing process for the dial body part 11 of the dial 10. FIG. 4 is a front view illustrating an outline of the dial body part 11.

As illustrated in FIG. 3, first, as a substrate pattern forming step, a pattern is formed using processing such as cutting processing, laser processing, chemical removal processing, polishing processing, and forging/casting processing, for example, at the surface 301 of the substrate 30 in the dial body part 11.

Next, as a multilayer film forming step, the multilayer film 31 is stacked at the surface 301 of the substrate 30 in the dial body part 11. Specifically, the color absorbing film 311 and the color adjusting film 312 are stacked at the surface 301 of the substrate 30 by ion-assisted vapor deposition, ion plating vapor deposition, vacuum vapor deposition, sputtering, or the like.

Note that FIG. 3 illustrates a state in which the multilayer film 31 is stacked at the surface 301 of the substrate 30 at which a pattern is formed.

Next, as a first transparent film forming step, the first transparent film 32 is formed at the multilayer film 31. Specifically, the first transparent film 32 is formed by applying an epoxy paint to the multilayer film 31 in a freely selected pattern by an inkjet printer. In the embodiment, the first transparent film 32 is formed to form a pattern including a plurality of lightning mark-like shapes. At this time, in the embodiment, since the first transparent film 32 is formed using an inkjet printer, it is possible to easily form the first transparent film 32 in a freely selected pattern.

Next, as a second transparent film forming step, the second transparent film 33 is formed and stacked at the first transparent film 32 or the multilayer film 31. Specifically, the second transparent film 33 is formed by applying an acrylic paint to the first transparent film 32 or the multilayer film 31 with an inkjet printer. That is, the second transparent film 33 is formed by applying an acrylic paint, with an inkjet printer, to the multilayer film 31 at which the first transparent film 32 is partially formed. At this time, the second transparent film 33 is formed so that an absolute value of the difference in refractive index with respect to the first transparent film 32 is 0.06 or greater.

By forming the dial body part 11 in this way, as illustrated in FIG. 4, a freely selected color tone can be applied to the dial body part 11 by the multilayer film 31.

In addition, since the refractive indices are different between the first transparent film 32 and the second transparent film 33, it is possible to express different color tones between a portion where the first transparent film 32 is formed and a portion where the first transparent film 32 is not formed. In other words, since refractive indices of transmitted light are different between a portion where the multilayer film 31 and the substrate 30 are visible through the first transparent film 32 and the second transparent film 33 and a portion where the multilayer film 31 and the substrate 30 are visible only through the second transparent film 33, different color tones can be expressed. Accordingly, since a pattern of the first transparent film 32 can be recognized due to the difference in color tone, it is possible to express a freely selected pattern, and it is possible to enhance design properties.

Further, in the embodiment, since a freely selected pattern is formed at the substrate 30 at which the multilayer film 31 is stacked, multi-layered and complicated patterns can be expressed by the pattern applied to the substrate 30 and the pattern of the first transparent film 32.

Figure 5:
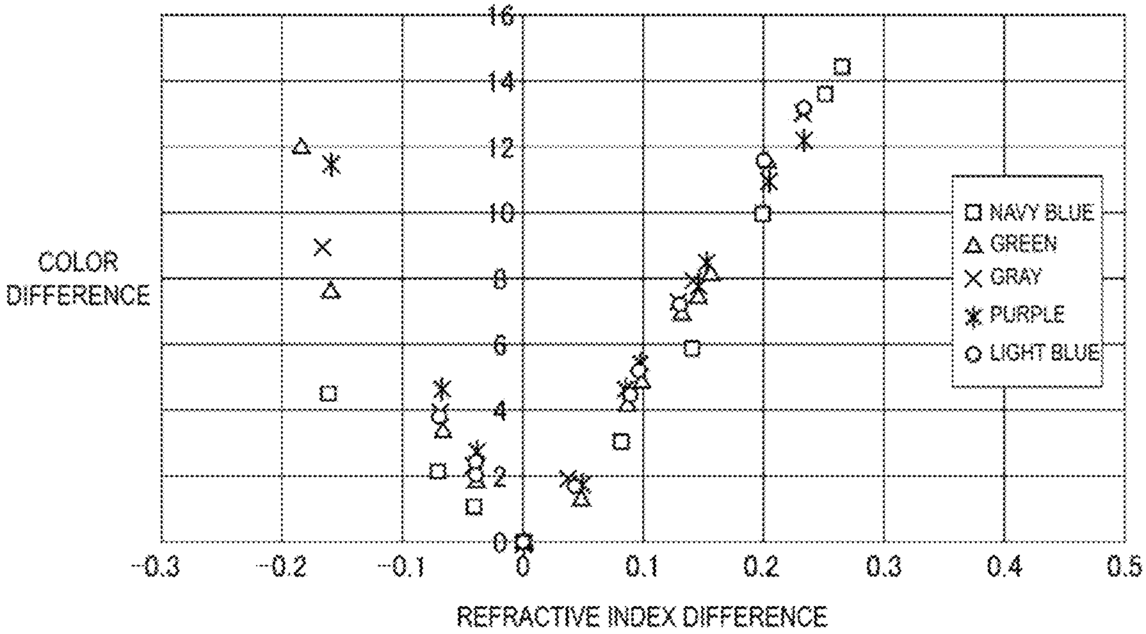
FIG. 5 is a graph showing a relationship between refractive index difference between a first transparent film and a second transparent film, and color difference when the dial body part is viewed in plan view.

FIG. 5 is a graph showing a relationship between refractive index difference between the first transparent film 32 and the second transparent film 33, and color difference between a portion where the first transparent film 32 is formed and a portion where the first transparent film 32 is not formed when the dial body part 11 is viewed in plan view. Note that in FIG. 5, color tones of the dial body part 11 in which the first transparent film 32 having a varied refractive index was formed with respect to the second transparent film 33 formed by applying an acrylic paint and the multilayer film 31 presenting five color tones of navy blue, green, gray, purple, and light blue were measured. L*a*b* was calculated using, as measurement conditions of the color tone, average reflection light at an incident angle of 0° C., in a CIE19644 space with a CIE standard light source D65. In addition, FIG. 5 shows values obtained by subtracting the refractive index of the first transparent film 32 from the refractive index of the second transparent film 33 as the refractive index difference.

As shown in FIG. 5, it was suggested that for any of the five color tones of navy blue, green, gray, purple, and light blue, the color difference between a portion where the first transparent film 32 is formed and a portion where the first transparent film 32 is not formed increases as the absolute value of the difference in refractive index increases.

In particular, when the absolute value of the difference in refractive index between the first transparent film 32 and the second transparent film 33 was 0.06 or greater, it was suggested that the color difference between a portion where the first transparent film 32 was formed and a portion where the first transparent film 32 was not formed was 1.6 or greater. In general, a color difference of 1.6 or greater is required for a difference in color to be visually recognized. Therefore, by setting the absolute value of the difference in refractive index between the first transparent film 32 and the second transparent film 33 to 0.06 or greater, the color difference between a portion where the first transparent film 32 is formed and a portion where the first transparent film 32 is not formed can be set to 1.6 or greater, and the difference in color tone can be more reliably visually recognized. Therefore, it was suggested that a freely selected pattern expressed by the pattern of the first transparent film 32 can be visually recognized.

Operational Effects of Embodiment

According to the above-described embodiment, the following effects can be achieved.

In the embodiment, since the multilayer film 31 that covers at least a part of the substrate 30 and includes the color adjusting film 312 that has the function of adjusting the color tone is provided, it is possible to apply a freely selected color tone to the dial 10. Further, in the embodiment, since the first transparent film 32 formed in a freely selected pattern and the second transparent film 33 having a refractive index different from that of the first transparent film 32 by a predetermined difference are stacked at the multilayer film 31, different color tones can be expressed between a portion where the first transparent film 32 is formed and a portion where the first transparent film 32 is not formed. For this reason, it is possible to express a freely selected pattern by the pattern of the first transparent film 32, and thus it is possible to improve design properties.

In the embodiment, since a freely selected pattern is formed at the surface 301, of the substrate 30, covered with the multilayer film 31, the pattern formed at the substrate 30 can be expressed in addition to the pattern expressed by the pattern of the first transparent film 32. Therefore, more complicated patterns can be expressed.

In the embodiment, since a freely selected pattern is formed at the first transparent film 32 by an inkjet printer, the first transparent film 32 in a freely selected pattern can be easily formed at the multilayer film 31.

In the embodiment, since the absolute value of the difference in refractive index between the first transparent film 32 and the second transparent film 33 is 0.06 or greater, the difference in color tone between a portion where the first transparent film 32 is formed and a portion where the first transparent film 32 is not formed can be more reliably visually recognized. Therefore, a freely selected pattern expressed by the pattern of the first transparent film 32 can be visually recognized.

In the embodiment, since the color difference between a portion where the first transparent film 32 is formed and a portion where the first transparent film 32 is not formed is 1.6 or greater in plan view viewed from the thickness direction of the substrate 30, the difference in color tone between a portion where the first transparent film 32 is formed and a portion where the first transparent film 32 is not formed can be more reliably visually recognized. Therefore, a freely selected pattern expressed by the pattern of the first transparent film 32 can be visually recognized.

Modifications

Note that the present disclosure is not limited to the above-described embodiments, and may be modified and changed in so far as the advantages of the present disclosure can be achieved.

In the above-described embodiment, the multilayer film 31 includes the seven layers consisting of the two layers of the color absorbing films 311 and the five layers of the color adjusting films 312, but this is not limitative. For example, the multilayer film 31 may include eight or more layers of the color absorbing films and the color adjusting films, or may include six or less layers.

In the above-described embodiment, the pattern is formed at the substrate 30 using processing such as cutting processing, laser processing, chemical removal processing, polishing processing, and forging/casting processing, but this is not limitative. For example, the surface of the substrate may be subjected to mirror finishing or surface conditioning. That is, the multilayer film, the first transparent film, and the second transparent film may be stacked at the substrate in an unpatterned state.

In the above-described embodiment, the multilayer film 31, the first transparent film 32, and the second transparent film 33 are stacked at the substrate 30 of the dial body part 11, but this is not limitative. For example, the multilayer film and the second transparent film may be stacked at the substrate 30 of the dial body part, and the multilayer film, the first transparent film, and the second transparent film may be stacked at a position corresponding to the hour mark. That is, the pattern of the first transparent film may be formed such that the hour mark can be expressed. With such a configuration, different color tones can be expressed between the dial body part and the hour mark, and thus the hour mark can be visually recognized in the dial body part.

In the above-described embodiment, the first transparent film 32 is formed in a freely selected pattern by an inkjet printer, but this is not limitative. For example, the first transparent film may be formed in a freely selected pattern by ion-assisted deposition, ion plating deposition, vacuum deposition, sputtering, or the like.

Similarly, in the above-described embodiment, the second transparent film 33 is formed by an inkjet printer, but this is not limitative. For example, the second transparent film may be formed in a freely selected pattern by ion-assisted deposition, ion plating deposition, vacuum deposition, sputtering, or the like.

In the above-described embodiment, the watch component of the present disclosure is configured as the dial 10, but this is not limitative. For example, the watch component of the present disclosure may be configured as any one of an oscillating weight, a hand, a bezel, or a belt.

Overview of Present Disclosure

A watch component of the present disclosure includes a region, the region including: a substrate, a multilayer film covering at least a part of the substrate and including a color adjusting film having a function of adjusting a color tone, a first transparent film stacked at the multilayer film, having a predetermined refractive index, and formed in a freely selected pattern, and a second transparent film stacked at the first transparent film or the multilayer film, and having a refractive index different from that of the first transparent film by a predetermined difference.

In the present disclosure, since the multilayer film that covers at least a part of the substrate and includes the color adjusting film that has the function of adjusting the color tone is provided, it is possible to apply a freely selected color tone to the watch component. Further, in the present disclosure, since the first transparent film formed in a freely selected pattern and the second transparent film having a refractive index different from that of the first transparent film by a predetermined difference are stacked at the multilayer film, different color tones can be expressed between a portion where the first transparent film is formed and a portion where the first transparent film is not formed. For this reason, it is possible to express a freely selected pattern by the pattern of the first transparent film, and thus it is possible to improve design properties.

A watch component of the present disclosure includes a region, the region including: a substrate, a multilayer film covering at least a part of the substrate and including a color adjusting film having a function of adjusting a color tone, a first transparent film stacked at the multilayer film, having a predetermined refractive index, and formed in a freely selected pattern, and a second transparent film stacked at the multilayer film at which the first transparent film is partially formed, and having a refractive index different from that of the first transparent film by a predetermined difference.

In the present disclosure, since the multilayer film that covers at least a part of the substrate and includes the color adjusting film that has the function of adjusting the color tone is provided, it is possible to apply a freely selected color tone to the watch component. Further, in the present disclosure, since the first transparent film formed in a freely selected pattern and the second transparent film having a refractive index different from that of the first transparent film by a predetermined difference are stacked at the multilayer film, different color tones can be expressed between a portion where the first transparent film is formed and a portion where the first transparent film is not formed. For this reason, it is possible to express a freely selected pattern by the pattern of the first transparent film, and thus it is possible to improve design properties.

In the watch component of the present disclosure, a freely selected pattern may be formed at a surface, of the substrate, covered with the multilayer film.

As a result, in addition to the pattern expressed by the pattern of the first transparent film, the pattern formed at the substrate can be expressed, so that more complicated patterns can be expressed.

In the watch component of the present disclosure, the freely selected pattern of the first transparent film may be formed by an inkjet printer.

Thus, the first transparent film in a freely selected pattern can be easily formed at the multilayer film.

In the watch component of the present disclosure, the absolute value of the difference in refractive index between the first transparent film and the second transparent film may be 0.06 or greater.

Accordingly, the difference in color tone between a portion where the first transparent film is formed and a portion where the first transparent film is not formed can be more reliably visually recognized. Therefore, a freely selected pattern expressed by the pattern of the first transparent film can be visually recognized.

In the watch component of the present disclosure, the color difference between a portion where the first transparent film is formed and a portion where the first transparent film is not formed may be 1.6 or greater in plan view viewed from the thickness direction of the substrate.

Accordingly, the difference in color tone between a portion where the first transparent film is formed and a portion where the first transparent film is not formed can be more reliably visually recognized. Therefore, a freely selected pattern expressed by the pattern of the first transparent film can be visually recognized.

A watch of the present disclosure is a watch configured using the watch component, wherein any one of a dial, an oscillating weight, an abbreviation, a hand, a bezel, or a belt is configured using the watch component.

A method for manufacturing a watch component of the present disclosure includes a multilayer film forming step of forming a multilayer film to cover at least a part of a substrate, the multilayer film including a color adjusting film having a function of adjusting a color tone, a first transparent film forming step of stacking, at the multilayer film, a first transparent film having a predetermined refractive index and formed in a freely selected pattern, the first transparent film forming step being performed after the multilayer film forming step, and a second transparent film stacking step of stacking, at the first transparent film or the multilayer film, a second transparent film having a refractive index different from that of the first transparent film by a predetermined difference, the second transparent film stacking step being performed after the first transparent film forming step.

In the present disclosure, since the multilayer film that includes the color adjusting film having the function of adjusting the color tone is formed covering at least a part of the substrate, it is possible to apply a freely selected color tone to the watch component. Further, in the present disclosure, since the first transparent film formed in a freely selected pattern and the second transparent film having a refractive index different from that of the first transparent film by a predetermined difference are stacked at the color tone film, different color tones can be expressed between a portion where the first transparent film is formed and a portion where the first transparent film is not formed. For this reason, it is possible to express a freely selected pattern by the pattern of the first transparent film, and thus it is possible to improve design properties.

A method for manufacturing a watch component of the present disclosure includes a multilayer film forming step of forming a multilayer film to cover at least a part of a substrate, the multilayer film including a color adjusting film having a function of adjusting a color tone, a first transparent film forming step of stacking, at the multilayer film, a first transparent film having a predetermined refractive index and formed in a freely selected pattern, the first transparent film forming step being performed after the multilayer film forming step, and a second transparent film stacking step of stacking, at the multilayer film at which the first transparent film is partially formed, a second transparent film having a refractive index different from that of the first transparent film by a predetermined difference, the second transparent film stacking step being performed after the first transparent film forming step.

In the present disclosure, since the multilayer film that includes the color adjusting film having the function of adjusting the color tone is formed covering at least a part of the substrate, it is possible to apply a freely selected color tone to the watch component. Further, in the present disclosure, since the first transparent film formed in a freely selected pattern and the second transparent film having a refractive index different from that of the first transparent film by a predetermined difference are stacked at the color tone film, different color tones can be expressed between a portion where the first transparent film is formed and a portion where the first transparent film is not formed. For this reason, it is possible to express a freely selected pattern by the pattern of the first transparent film, and thus it is possible to improve design properties.

The method for manufacturing a watch component of the present disclosure may include a substrate pattern forming step of forming a freely selected pattern at a surface, of the substrate, to be covered with the multilayer film, the substrate pattern forming step being performed before the multilayer film forming step.

As a result, in addition to the pattern expressed by the pattern of the first transparent film, the pattern formed at the substrate can be expressed, so that more complicated patterns can be expressed.

In the method for manufacturing a watch component of the present disclosure, in the first transparent film forming step, the first transparent film may be formed in a freely selected pattern by an inkjet printer.

Thus, the first transparent film in a freely selected pattern can be easily formed at the multilayer film.

What is claimed is:

1. A watch component comprising a region, the region including:

a substrate, a multilayer film covering at least a part of the substrate and including a color adjusting film having a function of adjusting a color tone, a first transparent film stacked at the multilayer film, having a predetermined refractive index, and formed in a freely selected pattern, and a second transparent film stacked at the first transparent film or the multilayer film, and having a refractive index different from that of the first transparent film by a predetermined difference, wherein a color difference between a portion where the first transparent film is formed and a portion where the first transparent film is not formed is 1.6 or greater in plan view viewed from a thickness direction of the substrate as determined by measuring an average reflection light at an incident angle of 0 in a CIE 19644 space with a CIE standard light source.

2. A watch component comprising a region, the region including:

a substrate, a multilayer film covering at least a part of the substrate and including a color adjusting film having a function of adjusting a color tone, a first transparent film stacked at the multilayer film, having a predetermined refractive index, and formed in a freely selected pattern, and a second transparent film stacked at the multilayer film at which the first transparent film is partially formed, and having a refractive index different from that of the first transparent film by a predetermined difference, wherein a color difference between a portion where the first transparent film is formed and a portion where the first transparent film is not formed is 1.6 or greater in plan view viewed from a thickness direction of the substrate as determined by measuring an average reflection light at an incident angle of 0 in a CIE 19644 space with a CIE standard light source.

3. The watch component according to claim 1, wherein a freely selected pattern is formed at a surface, of the substrate, covered with the multilayer film.

4. The watch component according to claim 1, wherein the freely selected pattern of the first transparent film is formed by an inkjet printer.

5. The watch component according to claim 1, wherein an absolute value of a difference in refractive index between the first transparent film and the second transparent film is 0.06 or greater.

6. A watch configured using the watch component according to claim 1, wherein any one of a dial, an oscillating weight, an abbreviation, a hand, a bezel, or a belt is configured using the watch component.

7. A method for manufacturing a watch component, the method comprising:

a multilayer film forming step of forming a multilayer film to cover at least a part of a substrate, the multilayer film including a color adjusting film having a function of adjusting a color tone;

a first transparent film forming step of stacking, at the multilayer film, a first transparent film having a predetermined refractive index and formed in a freely selected pattern, the first transparent film forming step being performed after the multilayer film forming step; and a second transparent film stacking step of stacking, at the first transparent film or the multilayer film, a second transparent film having a refractive index different from that of the first transparent film by a predetermined difference, the second transparent film stacking step being performed after the first transparent film forming step, wherein a color difference between a portion where the first transparent film is formed and a portion where the first transparent film is not formed is 1.6 or greater in plan view viewed from a thickness direction of the substrate as determined by measuring an average reflection light at an incident angle of 0 in a CIE 19644 space with a CIE standard light source.

8. The method for manufacturing a watch component according to claim 7, further comprising a substrate pattern forming step of forming a freely selected pattern at a surface, of the substrate, to be covered with the multilayer film, substrate pattern forming step being performed before the multilayer film forming step.

9. The method for manufacturing a watch component according to claim 7, wherein in the first transparent film forming step, the first transparent film is formed in a freely selected pattern by an inkjet printer.

10. A method for manufacturing a watch component, the method comprising:

a multilayer film forming step of forming a multilayer film to cover at least a part of a substrate, the multilayer film including a color adjusting film having a function of adjusting a color tone;

a first transparent film forming step of stacking, at the multilayer film, a first transparent film having a predetermined refractive index and formed in a freely selected pattern, the first transparent film forming step being performed after the multilayer film forming step; and a second transparent film stacking step of stacking, at the multilayer film at which the first transparent film is partially formed, a second transparent film having a refractive index different from that of the first transparent film by a predetermined difference, the second transparent film stacking step being performed after the first transparent film forming step, wherein a color difference between a portion where the first transparent film is formed and a portion where the first transparent film is not formed is 1.6 or greater in plan view viewed from a thickness direction of the substrate as determined by measuring an average reflection light at an incident angle of 0 in a CIE 19644 space with a CIE standard light source.

* * * * *